United States Patent
Xiong et al.

(10) Patent No.: US 10,518,420 B1
(45) Date of Patent: Dec. 31, 2019

(54) FINGER OF ROBOTIC HAND AND ROBOT HAVING THE SAME

(71) Applicant: UBTECH Robotics Corp, Shenzhen (CN)

(72) Inventors: Youjun Xiong, Shenzhen (CN); Wenhua Yu, Shenzhen (CN); Qi Zhao, Shenzhen (CN); Kunlei Zhao, Shenzhen (CN); Jiawen Hu, Shenzhen (CN); Yangyu Pi, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/233,139

(22) Filed: Dec. 27, 2018

(30) Foreign Application Priority Data

Oct. 31, 2018 (CN) .......................... 2018 1 1289928

(51) Int. Cl.
| | | |
|---|---|---|
| *B25B 15/00* | (2006.01) | |
| *B25J 15/06* | (2006.01) | |
| *B25J 15/08* | (2006.01) | |
| *B25J 15/00* | (2006.01) | |
| *B25J 15/12* | (2006.01) | |

(52) U.S. Cl.
CPC .......... *B25J 15/0009* (2013.01); *B25J 15/12* (2013.01)

(58) Field of Classification Search
CPC .............................. B25J 15/08; B25J 15/0009
USPC .................................................. 294/106, 111
See application file for complete search history.

(56) References Cited

U.S. PATENT DOCUMENTS

| | | | | |
|---|---|---|---|---|
| 3,618,967 A | * | 11/1971 | Sugiyama | B62B 9/18 280/47.11 |
| 4,350,381 A | * | 9/1982 | Hellmann | B25J 15/0009 269/266 |
| 4,364,593 A | * | 12/1982 | Maeda | A61F 2/588 294/106 |
| 4,921,293 A | * | 5/1990 | Ruoff | A61F 2/583 294/106 |
| 4,957,320 A | * | 9/1990 | Ulrich | B25J 9/102 192/56.1 |
| 5,257,871 A | * | 11/1993 | Zona | B25J 5/02 104/93 |
| 5,647,622 A | * | 7/1997 | Schectman | B25J 1/02 294/111 |
| 6,247,738 B1 | * | 6/2001 | Winkel | B25J 15/0009 294/111 |
| 7,445,260 B2 | * | 11/2008 | Nihei | B25J 9/1612 294/106 |
| 9,751,216 B2 | * | 9/2017 | Kim | B25J 5/007 |
| 2002/0060465 A1 | * | 5/2002 | Laliberte | B25J 15/0009 294/106 |

(Continued)

*Primary Examiner* — Paul T Chin (57) ABSTRACT

A finger of a robotic hand includes a phalanx portion including two phalanxes rotatably coupled to each other, one of the two phalanxes being rotatable about a rotation axis with respect to the other one of the two phalanxes; and a stopper structure including a first stopper member connected to the one of the two phalanxes and a second stopper member connected to the other one of the two phalanxes. The first stopper member extends around the rotation axis, and a circumferential space is defined between the first stopper member and the second stopper member and allowing the first stopper member to rotate together with the one of the two phalanxes in a predetermined range.

19 Claims, 9 Drawing Sheets

(56) References Cited

U.S. PATENT DOCUMENTS

2004/0144670 A1* 7/2004 Riley .................. A61L 2/26
                                                    206/370
2013/0057004 A1* 3/2013 Murata ............... B25J 15/0009
                                                    294/106

* cited by examiner

FINGER OF ROBOTIC HAND AND ROBOT HAVING THE SAME

CROSS REFERENCE TO RELATED APPLICATIONS

This application claims priority to Chinese Patent Application No. 201811289928.0, filed Oct. 31, 2018, which is hereby incorporated by reference herein as if set forth in its entirety.

BACKGROUND

1. Technical Field

The present disclosure generally relates to robots, and particularly to a finger of a robotic hand and a robot including the finger.

2. Description of Related Art

Manipulable hand-like apparatuses are utilized in several industries. One such apparatus is a multi-fingered robotic hand. The multi-fingered robotic hand includes a plurality of digits capable of performing certain grasping operations. It is always desirable and useful to provide a robotic hand that is simple in structure and has damage-proof ability in certain scenarios.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1, 3 and 5-6, in one embodiment, a finger 100 of a robotic hand includes a phalanx portion 10 including two phalanxes 11 rotatably coupled to each other and a stopper structure 20 includes a first stopper member 115a connected to the one of the two phalanxes 11 and a second stopper member 115b connected to the other one of the two phalanxes 11. One of the two phalanxes 11 is rotatable about a rotation axis with respect to the other one of the two phalanxes 11. The first stopper member 115a extending around the rotation axis. A circumferential space C (see FIG. 6) is defined between the first stopper member 115a and the second stopper member 115b. The space C allows the first stopper member 115a to rotate together with the one of the two phalanxes 11 in a predetermined range. Rotation of the phalanxes 11 will cause the finger 100 to flex or extend.

Figure 6:
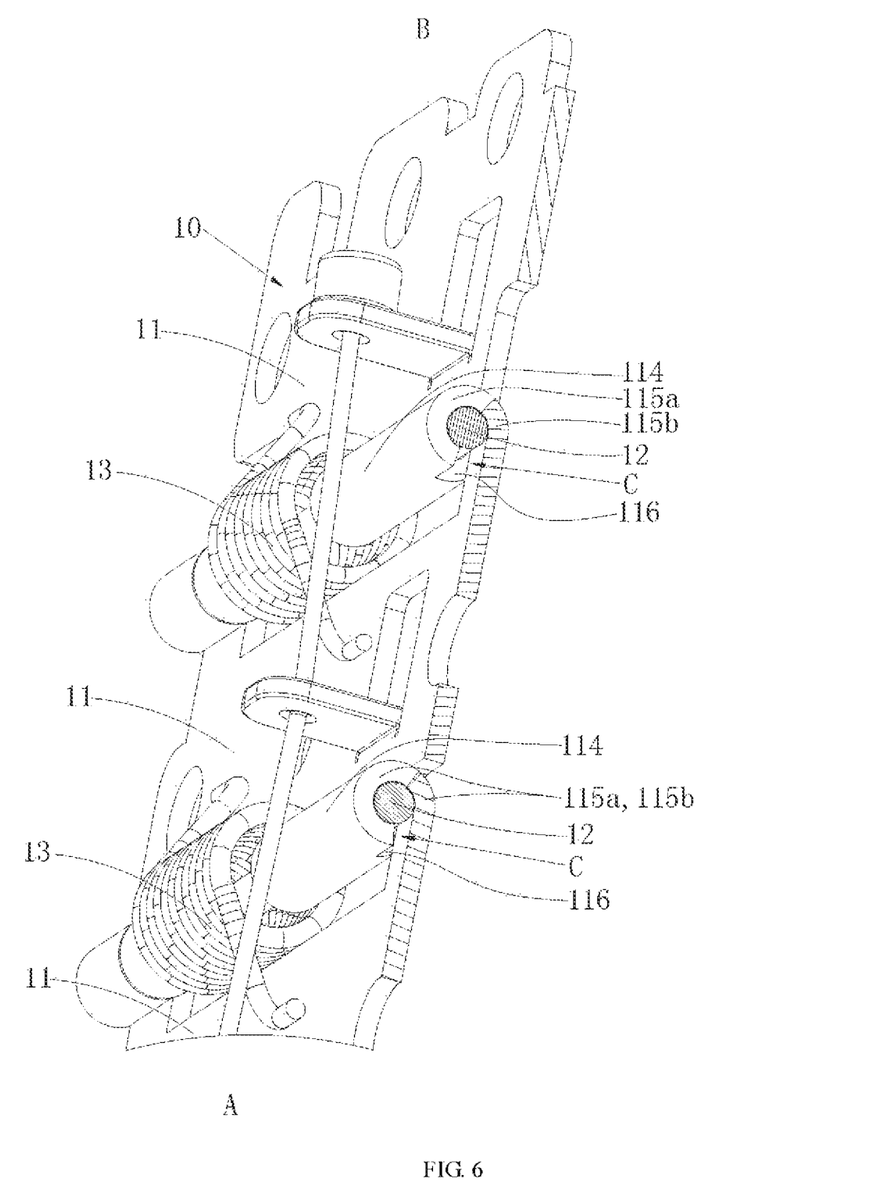
FIG. 6 is an isometric cross-sectional view of the finger of FIG. 1 in an extend stated.
Figure 7:
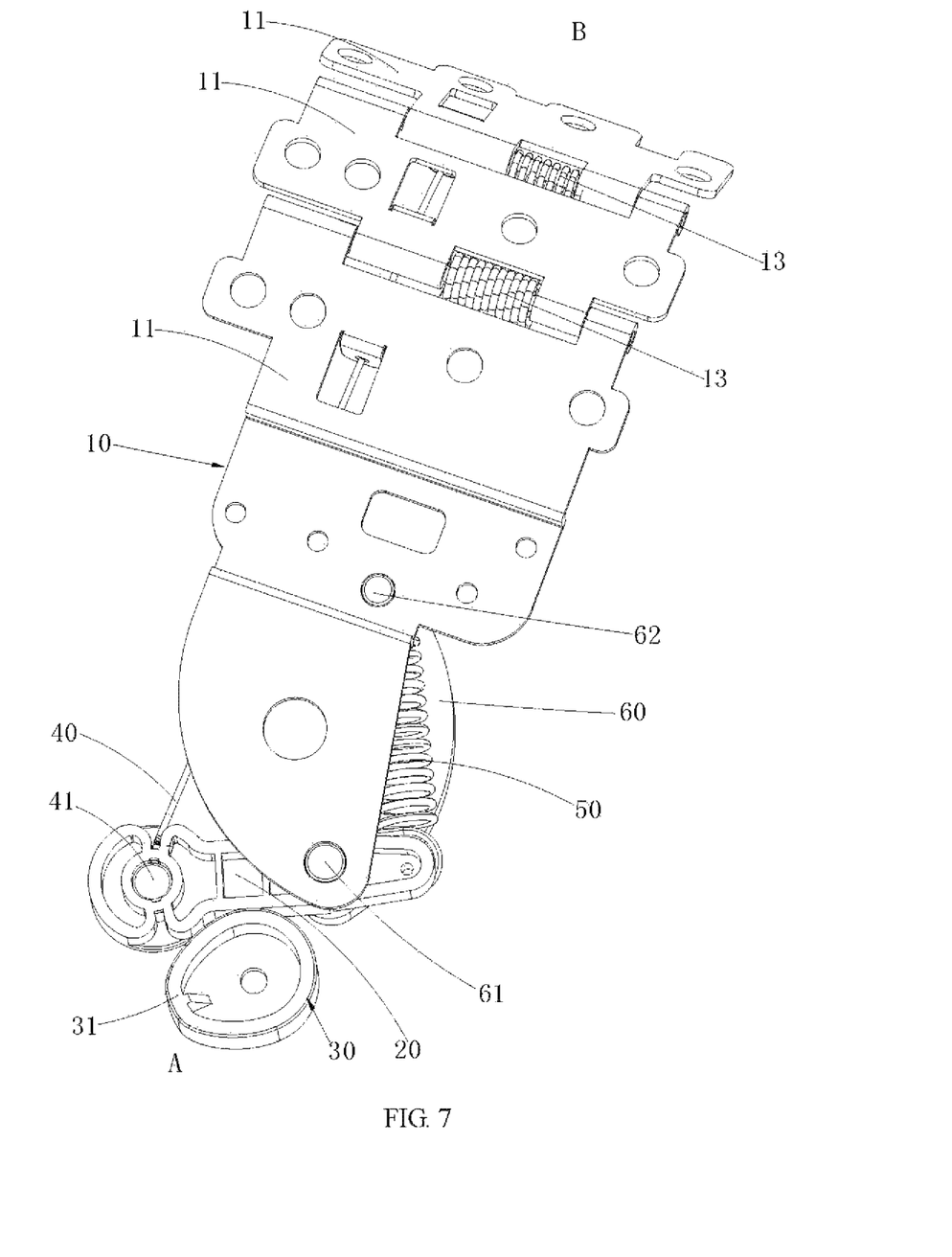
FIG. 7 is a schematic isometric view of the finger of FIG. 1 in a flexed state.

With such configuration, during rotation of one phalanx 11, when the stopper 115a comes into contact with the stopper 115b, the rotation of the phalanx 11 is stopped, thereby allowing one phalanx 11 to rotate with respect to the other phalanx 11 within a desired range. Thus, as shown in FIG. 6, when the two phalanxes 11 are flush with each other, the upper end of the stopper 115a comes into contact with the stopper 115b and further rotation of the upper phalanx 11 is stopped, thereby prevent the hyperextension of the finger 100. In addition, such configuration can increase the strength and hardness of the phalanxes 11, and prevent them from being bent and damaged by external force, thereby increasing the service life of the phalanxes 11.

Figure 8:
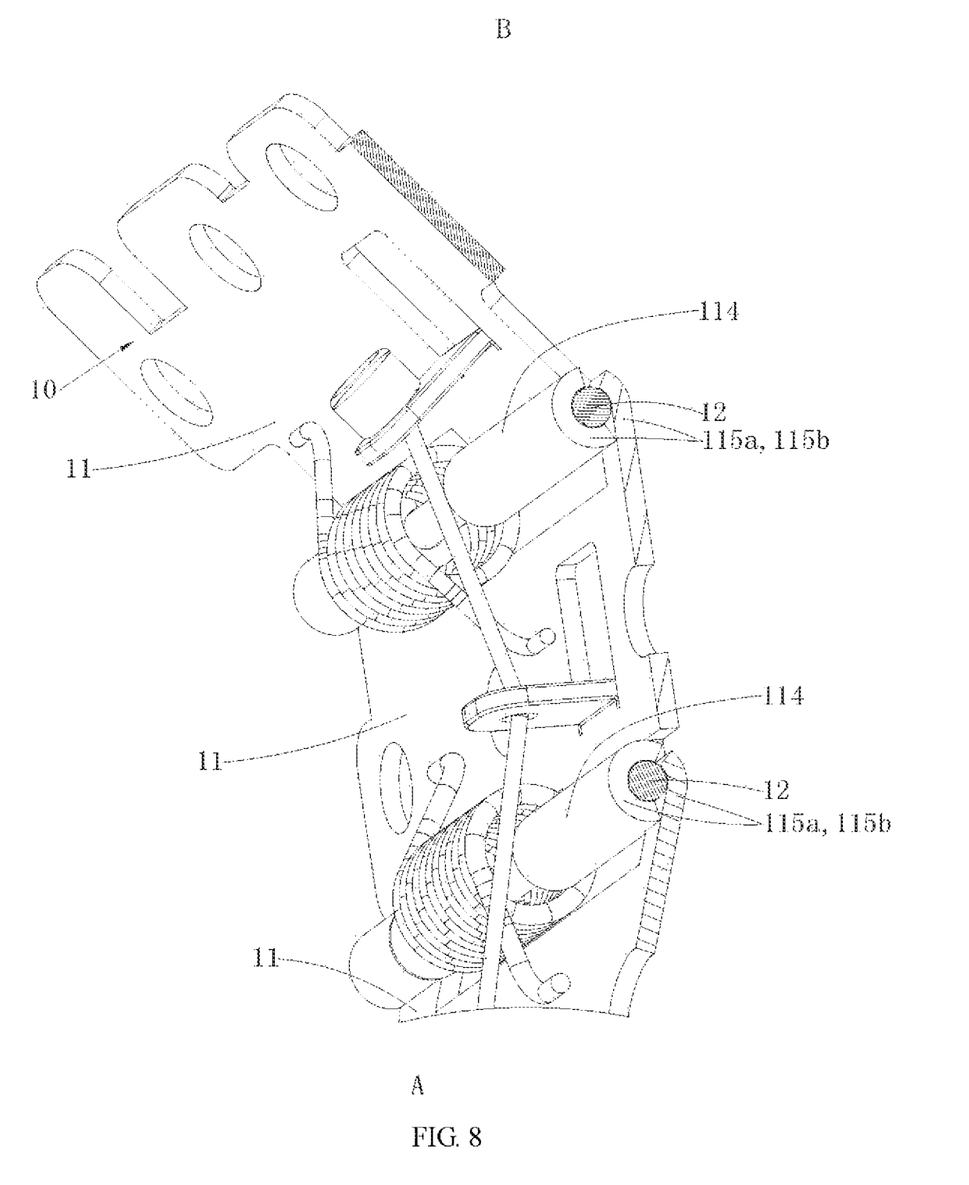
FIG. 8 is an isometric cross-sectional view of the finger of FIG. 1 in a flexed stated.

In the embodiment, the stopper member 115a includes an upper end and a lower end, and the stopper member 115b includes top end and a surface facing the stopper member 115a. As shown in FIG. 6, when the upper end of the stopper member 115a comes into contact with the top end of the stopper member 115b, further rotation of the upper phalanx 11 is stopped. As shown in FIG. 8, when the lower end of the stopper member 115a comes into contact with the surface of the stopper member 115b, further rotation of the upper phalanx 11 is stopped.

Each phalanx 11 is made of sheet metal and defines a mounting hole for connection with a fastener such that the phalanx 11 can be connected with other component.

Figure 5:
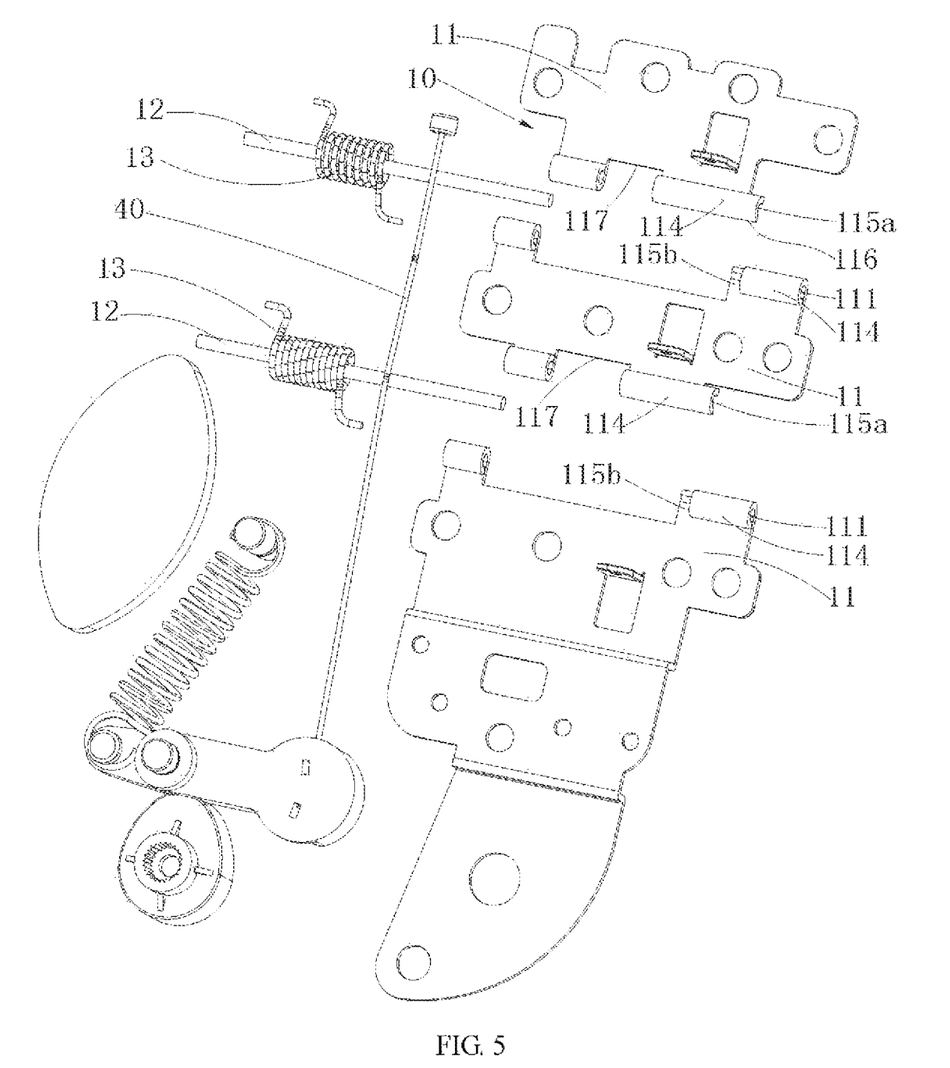
FIG. 5 is an isometric exploded view of the finger of FIG. 4.

Referring to FIGS. 5-6 and 8, in one embodiment, each of the phalanxes 11 defines an axle hole 111. An axle 12 is partly fixed in the axle hole 111 of one phalanx 11 and partly, rotatably fit in the axle hole 111 of the adjacent phalanx 11 so as to rotatably connect two adjacent phalanxes 11 together. In the embodiment, the axle hole 111 is formed by bending an edge of each phalanx 11. The stopper member 115a extends from an end of one of the two axle holes 111 along the rotation axis, and the second stopper member 115b extends from an end of the other one of the two axle holes 111 along the rotation axis.

In one embodiment, each phalanx 11 includes a bent edge portion 114 formed by bending an edge thereof. The axle holes 111 are respectively defined in the bent edge portions 114 of the stopper members 115a and 115b. The first stopper member 115a extends from an end of a corresponding bent edge portion 114 along the rotation axis, and the second stopper member 115b extends from an end of a corresponding bent edge portion 114 along the rotation axis. In the embodiment, the stopper member 115a defines a notch 116 (see FIG. 6) in an axial end thereof. The notch 116 faces the surface of the stopper member 115b. The notch 116 and the surface of the stopper member 115b corporately define the space C. In the embodiment shown in FIGS. 5 and 6, the stopper member 115a has a curved or semi-circular cross section (see FIG. 6) that extends around the rotation axis, and the stopper member 115b includes a flat portion and a curved top end portion (see FIGS. 5 and 6). The stopper member 115a faces the stopper member 115b.

Referring again to FIGS. 1, 3 and 5, in one embodiment, a torsion spring 13 is arranged around each axle 12 and includes two arms 131 respectively abutting against two phalanxes 11 connected by the axle 12. During flexion of the finger 100, the torsion springs 13 will be twisted. When the torsion springs 13 rebound, the torsion springs 13 urge the rotate, which drives the finger 100 to extend. In the embodiment, the phalanx 11 defines a notch 117 in an edge thereof so as to receive the coiled portion of a torsion spring 13.

Referring again to FIGS. 1-4, in one embodiment, the finger 100 further includes a rope 40 and a transmission assembly. The rope 40 is connected to the one of the phalanxes 11 and the transmission assembly. in the embodiment, the rope 40 is connected to the uppermost phalanx 11. The transmission assembly is used to pull the rope 40 to move so as to enable the rope 40 to pull the one of the phalanxes 11 to rotate. The rope 40 may be a flexible wire rope.

In one embodiment, the transmission assembly includes a rotating member 20 that is rotatable with respect to the phalanx portion 10, a rotating cam 30 used to apply a pushing force to the rotating member 20, and an elastic member 50 used to apply a pulling force to pull the rotating member 20 to rotate, which causes the rotating member 20 to pull the rope 40 to move. The rotating cam 30 include a lateral surface 31 that stays in contact with the rotating member 20.

During operation, a driving device (e.g. a servo) drives the rotating cam 30 to rotate, and the rotating cam 30 then drives the rotating member 20 to rotate. When the rotating member 20 of FIG. 4 rotates in a clockwise direction, the rotating member 20 pulls the rope 40 to move. The rope 40 then pulls the uppermost phalanx 11 to rotate. The phalanx 11 then pulls an adjacent phalanx 11 to rotate toward the rotating member 20, which causes the finger 100 to flex. When the rotating member 20 of FIG. 4 rotates in a counterclockwise direction, the torsion springs 13 will rebound and cause the two phalanxes 11 to rotate away from the transmission assembly, which causes the finger 100 to extend.

The transmission assembly above has the following advantages: The transmission assembly requires less components and its structure is simple. Flexion and extension of the finger 100 can be achieved through engagement of the rope 40, the rotating member 20, the rotating cam 30 and the elastic member 50. By selecting a proper elastic member 50, desirable bending state of the finger can be realized with one degree of freedom. Because of the elastic member 50, the finger can always be flexed to avoid damage caused by hard impact when the finger is subjected to any external force.

The driving device can be set to operate at a non-limit state, which effectively avoid damage due to failure of the driving device 50.

The cam 30 has an irregular contour and defines a central hole for connection with the driving device. For example, when the driving device is a servo having an output shaft, the central hole is sized and shaped to allow the output shaft to fit therein so that the cam 30 can be connected to the output shaft. The rope 40 may be a flexible wire rope.

In one embodiment, the finger 100 further includes a base 60 and an axle 61 protruding from the base 60. The rotating member 20 defines a mounting hole 21, and the axle 61 is rotatably fit in the mounting hole 21 so as to rotatably connect the rotating member 20 to the base 60. With such configuration, it is easy to assemble the phalanx portion 10 and the rotating member 20 together. An end of the axle 61 opposite the base 60 is fixed to the phalanx portion 10 adjacent to a lower end A.

In one embodiment, the finger 100 further includes a post 62 protruding from a side of the base 60 where the axle 61 is located and spaced apart from the axle 61. An end of the post 62 opposite the base 60 is fixed to the phalanx portion 10. The base 60 is thus fixed to the phalanx portion 10 through the axle 61 and the post 62.

A first end of the elastic member 50 is connected to the rotating member 20 and a second opposite end of the elastic member 50 is connected to the post 62. The elastic member 50 is in a stretched state and applies a pull force to an end of the rotating member 20. Since the cam 30 has an irregular contour and a lateral surface that stays in contact with the rotating member 20, the distance between the rotation axis of the cam 30 and the contact point of the cam 30 with the rotating member 20 changes as the cam 30 rotates. When the distance gradually decreases as the cam 30 rotates, the rotating member 20 will be pulled by the elastic member 50 and rotate and pull the rope 40 to move, which will cause the finger 100 to flex. In the embodiment, the rotating member 20 includes a post 23 and an end of the elastic member 50 is fixed to the post 23.

In one embodiment, each of the phalanxes 11 includes a protruding tab 112, defining a through hole 113 that allows the rope 40 to pass therethrough. When the rope 40 is pulled to move toward the lower end A of the phalanx portion 10, the rope 40 pulls the phalanxes 11 to rotate, which causes the finger 100 to flex.

In one embodiment, the rotating member 20 defines a cavity 22 and the rope 40 includes two heads 41, 42 at opposite ends thereof. The head 41 is received in the cavity 22 so as to connect the rope 40 to the rotating member 20.

Figure 1:
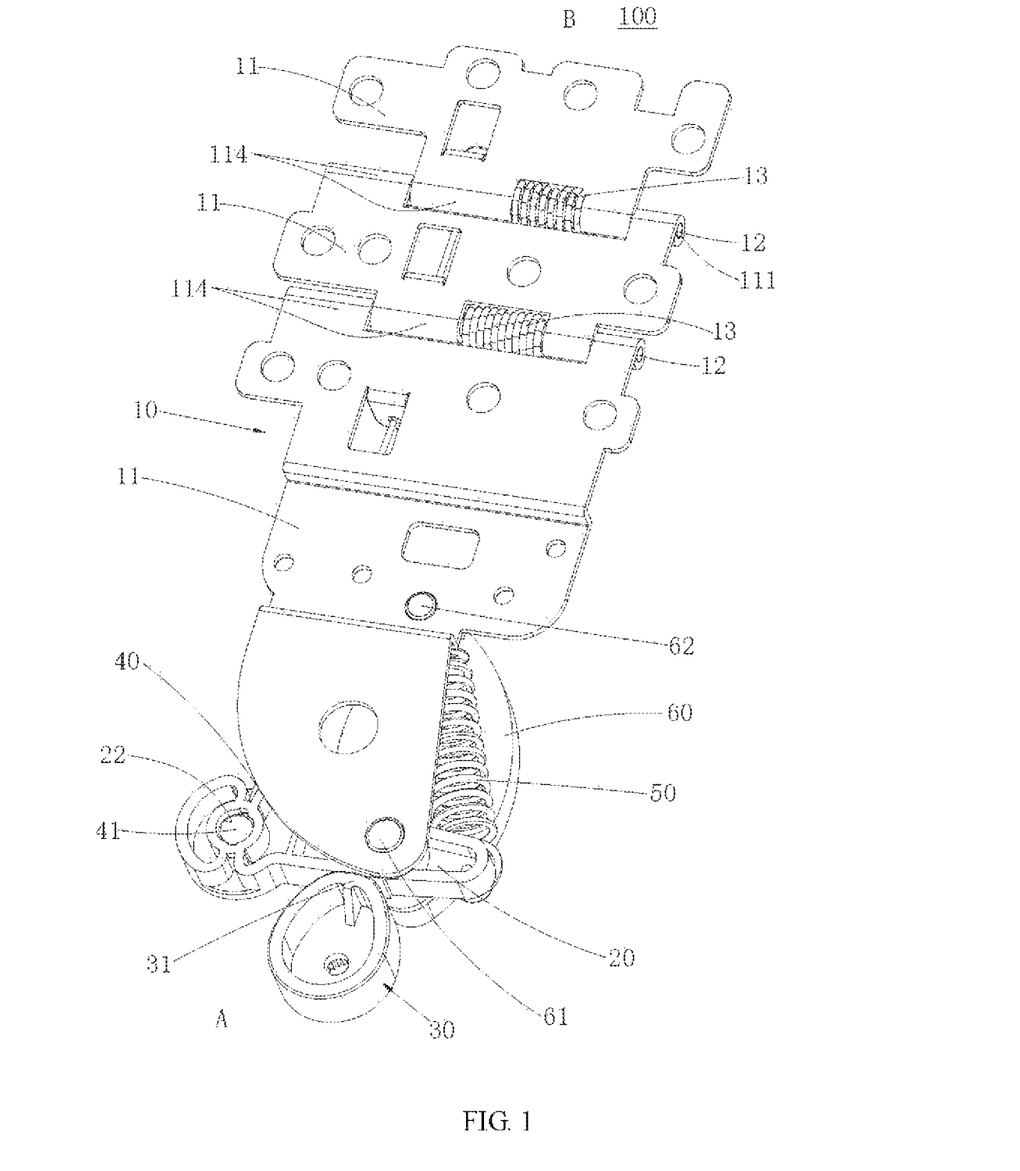
FIG. 1 is a schematic isometric view of a finger of a robotic hand according to an embodiment.
Figure 2:
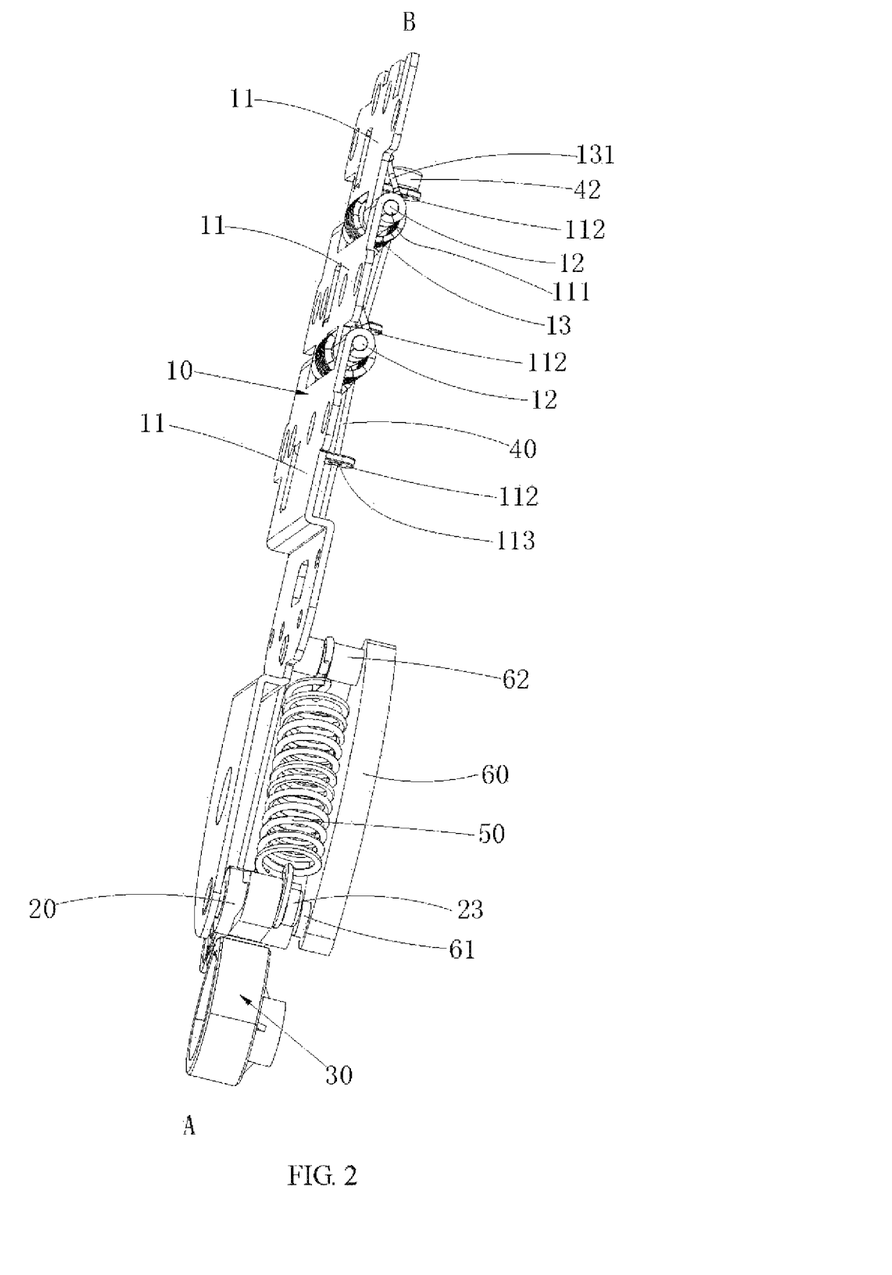
FIGS. 2 and 3 are similar to FIG. 1, but viewed from a different perspective.
Figure 3:
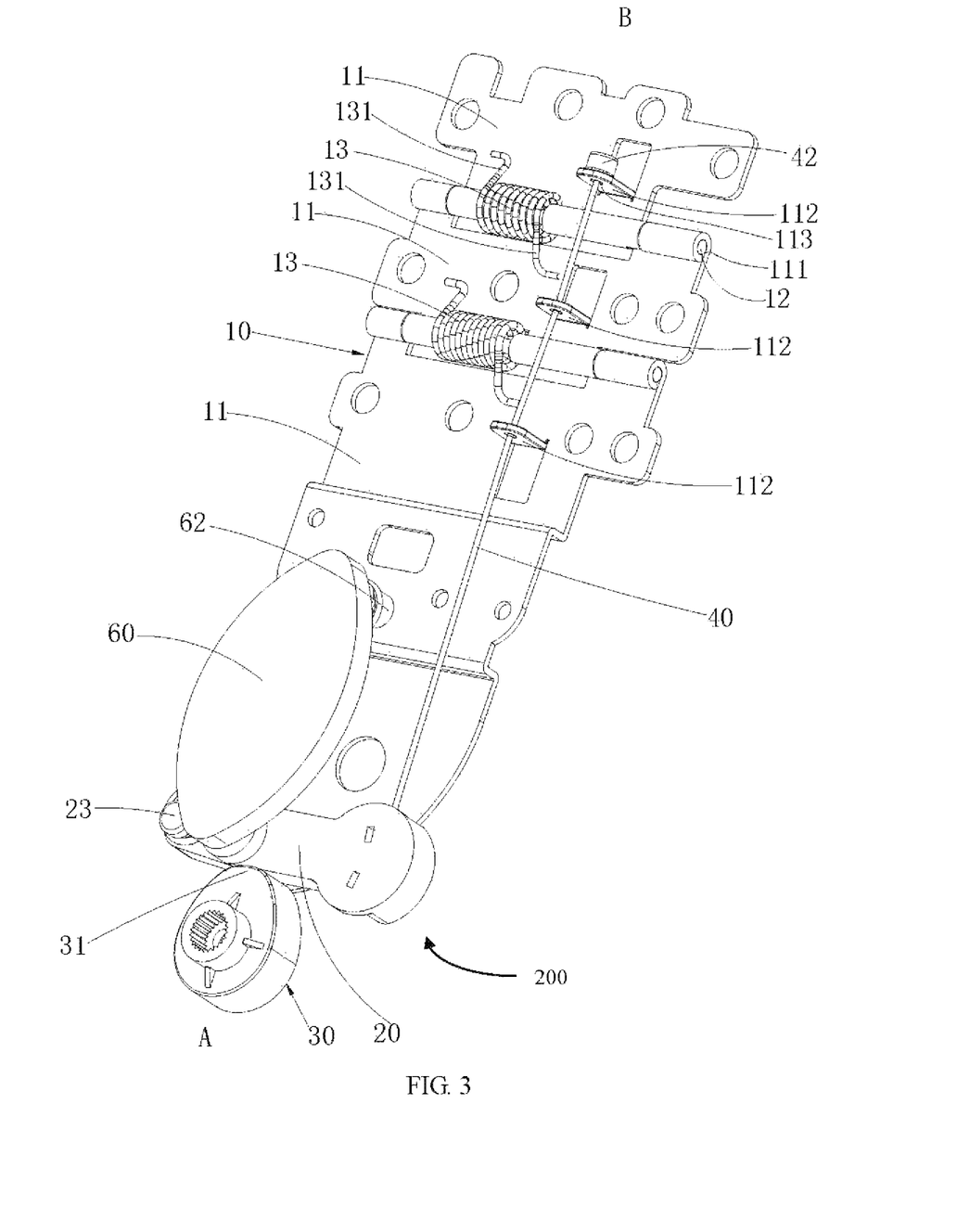
Figure 4:
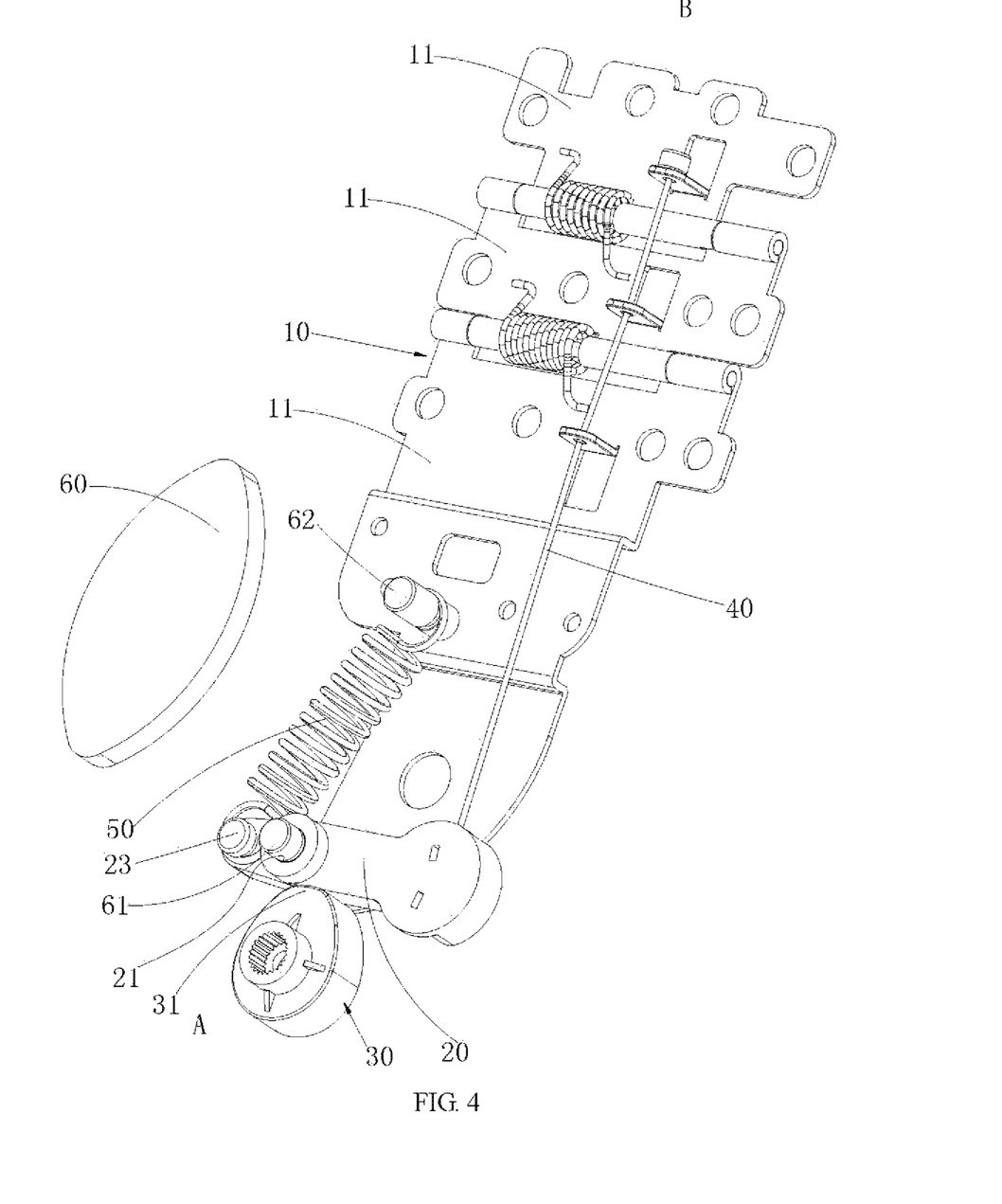
FIG. 4 is an isometric partially exploded view of the finger of FIG. 1.

The other head 42 abuts against one of the tabs 112 (i.e. the tab of the uppermost phalanx 11 at an upper end B of the phalanx portion in FIG. 4), which allows the rope 40 to apply a pulling force to the tab 112. When the rope 40 is pulled to move toward the end A of the phalanx portion 10, the pulling force from the rope 40 is transmitted to the uppermost phalanx 11 in FIG. 4 through the engagement of the head 42 with the tab 112. The uppermost phalanx 11 and its adjacent phalanx 11 then rotate, which causes the finger 100 to flex In one embodiment, the elastic member 50 is connected to a first end of the rotating member 20, and one of the ends of the rope 40 is connected to a second end of the rotating member 20 which is opposite the first end. The elastic member 50 and the rope 40 are located at the same side of the rotating member 20. A rotation axis of the rotation member 20 is located between the rope 40 and the elastic member 50. When the rope 40 is pulled to move toward the end A, the rope 40 is pulled to move toward the end A and causes the uppermost phalanx 11 and its adjacent phalanx 11 to rotate, which causes the finger 100 to flex.

As shown in FIG. 4, in the embodiment, the elastic member 50 applies a pulling force to the rotating member and can pull the rotating member 20 to rotate in a clockwise direction. The cam 30 applies a pushing force to the rotating member 20 and can push the rotating member 20 to rotate in a counterclockwise direction. The contact area of the cam 30 with the rotating member 20 is located between the rotation axis of the rotating member 20 and the rope 40.

In one embodiment, the cam 30 is located at one side (lower side in FIG. 4) of the rotating member 20, and the elastic member 50 and the rope 40 is located at the other side (upper side in FIG. 4).

In one embodiment, the two axles 12 connecting the three phalanxes 11 are parallel to each other. The phalanxes 11 rotate about an axis that is perpendicular to an axis about which the rotating member 20 rotates.

Figure 9:
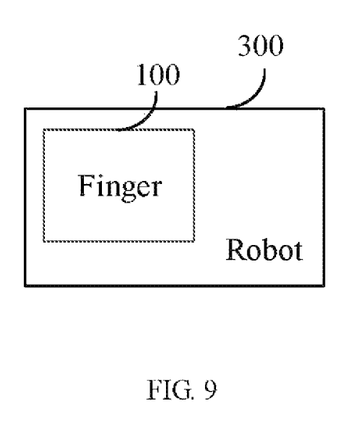
FIG. 9 is a schematic block diagram of a robot including the finger of FIG. 1.

Referring to FIG. 9, in one embodiment, a robot 300 includes the finger 100 as described above.

With such configuration, during rotation of one phalanx 11, when the stopper 115a comes into contact with the stopper 115b, the rotation of the phalanx 11 is stopped, thereby allowing one phalanx 11 to rotate with respect to the other phalanx 11 within a desired range. Thus, as shown in FIG. 6, when the two phalanxes 11 are flush with each other, the upper end of the stopper 115a comes into contact with the stopper 115b and further rotation of the upper phalanx 11 is stopped, thereby prevent the hyperextension of the finger 100. In addition, such configuration can increase the strength and hardness of the phalanxes 11, and prevent them from being bent and damaged by external force, thereby increasing the service life of the phalanxes 11.

In one embodiment, the number of the phalanxes 11 is three.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A finger of a robotic hand, comprising:
   a phalanx portion comprising two phalanxes rotatably coupled to each other, one of the two phalanxes being rotatable about a rotation axis with respect to the other one of the two phalanxes; and
   a stopper structure comprising a first stopper member connected to the one of the two phalanxes and a second stopper member connected to the other one of the two phalanxes, the first stopper member extending around the rotation axis, a circumferential space being defined between the first stopper member and the second stopper member and allowing the first stopper member to rotate together with the one of the two phalanxes in a predetermined range,
   wherein the finger further comprises a rope and a transmission assembly, the rope being connected to the one of the phalanxes and the transmission assembly, and the transmission assembly being configured to pull the rope to move so as to enable the rope to pull the one of the phalanxes to rotate.

2. The finger according to claim 1, further comprising an axle, wherein each of the two phalanxes defines an axle hole along the rotation axis, the axle is partly, securely received in one of the axle holes and partly, rotatably received in the other one of the axle holes, the first stopper member extends from an end of one of the two axle holes along the rotation axis, and the second stopper member extends from an end of the other one of the two axle holes along the rotation axis.

3. The finger according to claim 2, wherein each of the two phalanxes comprises a bent edge portion, the axle holes are respectively defined in the bent edge portions, the first stopper member extends from an end of one of the bent edge portions along the rotation axis, and the second stopper member extends from an end of the other one of the bent edge portions along the rotation axis.

4. The finger according to claim 2, further comprising a torsion spring arranged around the axle, wherein the torsion spring comprises two arms respectively abutting against the two phalanxes.

5. The finger according to claim 1, wherein the transmission assembly comprises a rotating member that is rotatable with respect to the phalanx portion, a rotating cam configured to apply a pushing force to the rotating member, and an elastic member configured to apply a pulling force to pull the rotating member to rotate, which causes the rotating member to pull the rope to move.

6. The finger according to claim 5, wherein the transmission assembly further comprises a base that comprises an axle and a post spaced apart from each other, the rotating member defines a mounting hole, the axle is rotatably fit in the mounting hole so as to rotatably connect the rotating member to the base, the axle and the post both comprise an end that is opposite to the base and fixed to the phalanx portion, and two opposite ends of the elastic member are respectively connected to the post and the rotating member.

7. The finger according to claim 5, wherein each of the phalanxes comprises a protruding tab, the protruding tab defines a through hole that allows the rope to pass therethrough, the rotating member defines a cavity, the rope comprises two heads at opposite ends thereof, one of the two heads is received in the cavity so as to connect the rope to the rotating member, and the other one of the two heads abuts against one of the tabs, which allows the rope to apply a pulling force to the one of the tabs.

8. The finger according to claim 5, wherein a rotation axis about which the rotating member rotates is located between the rope and the elastic member, and a contact area of the cam with the rotating member is located between the rotation axis of the rotating member and the rope.

9. A robot comprising a hand that comprises a finger, the finger comprising:
   a phalanx portion comprising two phalanxes rotatably coupled to each other, one of the two phalanxes being rotatable about a rotation axis with respect to the other one of the two phalanxes; and
   a stopper structure comprising a first stopper member connected to the one of the two phalanxes and a second stopper member connected to the other one of the two phalanxes, the first stopper member extending around the rotation axis, a circumferential space being defined between the first stopper member and the second stopper member and allowing the first stopper member to rotate together with the one of the two phalanxes in a predetermined range,
   wherein the finger further comprises a rope and a transmission assembly, the rope being connected to the one of the phalanxes and the transmission assembly, and the transmission assembly being configured to Dull the rope to move so as to enable the rope to pull the one of the phalanxes to rotate.

10. A finger of a robotic hand, comprising:
   a phalanx portion comprising two phalanxes rotatably coupled to each other, one of the two phalanxes being rotatable about a rotation axis with respect to the other one of the two phalanxes; and a stopper structure comprising a first stopper member connected to the one of the two phalanxes and a second stopper member connected to the other one of the two phalanxes, the first stopper member extending around the rotation axis, wherein the first stopper member defines a notch by which two circumferential ends of the first stopper member is spaced from each other, and the second stopper member is received within the notch and rotatable about the rotation axis with respect to the first stopper member in a predetermined range.

11. The finger according to claim 10, wherein the second stopper member has an end surface facing one of the circumferential ends of the first stopper member and a side surface facing the other one of the circumferential ends of the first stopper member, and wherein the side surface abuts the end face in an angle.

12. The finger according to claim 10, further comprising an axle, wherein each of the two phalanxes defines an axle hole along the rotation axis, the axle is partly, securely received in one of the axle holes and partly, rotatably received in the other one of the axle holes, the first stopper member extends from an end of one of the two axle holes along the rotation axis, and the second stopper member extends from an end of the other one of the two axle holes along the rotation axis.

13. The finger according to claim 12, wherein each of the two phalanxes comprises a bent edge portion, the axle holes are respectively defined in the bent edge portions, the first stopper member extends from an end of one of the bent edge portions along the rotation axis, and the second stopper member extends from an end of the other one of the bent edge portions along the rotation axis.

14. The finger according to claim 12, further comprising a torsion spring arranged around the axle, wherein the torsion spring comprises two arms respectively abutting against the two phalanxes.

15. The finger according to claim 10, further comprising a rope and a transmission assembly, wherein the rope is connected to the one of the phalanxes and the transmission assembly, and the transmission assembly is configured to pull the rope to move so as to enable the rope to pull the one of the phalanxes to rotate.

16. The finger according to claim 15, wherein the transmission assembly comprises a rotating member that is rotatable with respect to the phalanx portion, a rotating cam configured to apply a pushing force to the rotating member, and an elastic member configured to apply a pulling force to pull the rotating member to rotate, which causes the rotating member to pull the rope to move.

17. The finger according to claim 16, wherein the transmission assembly further comprises a base that comprises an axle and a post spaced apart from each other, the rotating member defines a mounting hole, the axle is rotatably fit in the mounting hole so as to rotatably connect the rotating member to the base, the axle and the post both comprise an end that is opposite to the base and fixed to the phalanx portion, and two opposite ends of the elastic member are respectively connected to the post and the rotating member.

18. The finger according to claim 16, wherein each of the phalanxes comprises a protruding tab, the protruding tab defines a through hole that allows the rope to pass therethrough, the rotating member defines a cavity, the rope comprises two heads at opposite ends thereof, one of the two heads is received in the cavity so as to connect the rope to the rotating member, and the other one of the two heads abuts against one of the tabs, which allows the rope to apply a pulling force to the one of the tabs.

19. The finger according to claim 16, wherein a rotation axis about which the rotating member rotates is located between the rope and the elastic member, and a contact area of the cam with the rotating member is located between the rotation axis of the rotating member and the rope.

* * * * *